United States Patent [19]
Cox et al.

[11] Patent Number: 5,613,566
[45] Date of Patent: Mar. 25, 1997

[54] ROW CROP STALK AND ROOT REMOVER

[75] Inventors: Philip D. Cox, Polk City, Iowa; Warren L. Thompson, Kandiyohi, Minn.

[73] Assignee: Deere & Company, Moline, Ill.

[21] Appl. No.: 498,860

[22] Filed: Jul. 6, 1995

[51] Int. Cl.$^6$ .................................................. A01B 49/02
[52] U.S. Cl. .......................... 172/174; 172/156; 172/574; 172/661; 171/62
[58] Field of Search ........................ 172/174, 158, 172/510, 642, 156, 169, 395, 254, 574, 349, 482, 15, 184, 140, 661; 171/61, 62

[56] References Cited

U.S. PATENT DOCUMENTS

| | | | |
|---|---|---|---|
| Re. 9,168 | 4/1880 | Johnson | 172/349 |
| 719,863 | 2/1903 | Poole | 172/482 |
| 1,432,143 | 10/1922 | White | 172/574 |
| 1,639,104 | 8/1927 | Paul | 172/158 |
| 1,784,313 | 12/1930 | Pittman | 172/158 |
| 1,884,273 | 10/1932 | Sandeen | 172/158 |
| 2,199,674 | 5/1940 | Ronning | 172/174 |
| 2,341,143 | 2/1944 | Herr | 172/158 |
| 2,352,963 | 7/1944 | McMahon | 172/574 |
| 2,363,268 | 11/1944 | Schiel et al. | 97/22 |
| 2,635,520 | 4/1953 | Pugh | 172/510 |
| 2,651,905 | 9/1953 | Schlueter | 56/255 |
| 3,058,531 | 10/1962 | Beaman et al. | 172/15 |
| 3,621,922 | 11/1971 | Hinken | 172/510 X |
| 3,773,113 | 11/1973 | Nixon | 172/642 |
| 4,295,532 | 10/1981 | Williams et al. | 172/184 |
| 4,365,674 | 12/1982 | Orthman | 172/574 X |
| 4,489,787 | 12/1984 | Gary | 172/1 |
| 4,550,122 | 10/1985 | David et al. | 172/158 |
| 4,562,780 | 1/1986 | Leiblich | 172/574 X |
| 4,585,073 | 4/1986 | Mayeda et al. | 172/169 X |
| 4,588,033 | 5/1986 | Orthman | 171/61 |
| 4,629,005 | 12/1986 | Hood, Jr. et al. | 171/61 X |
| 4,738,316 | 4/1988 | Wood | 172/603 |
| 4,779,684 | 10/1988 | Schultz | 171/62 |
| 4,819,737 | 4/1989 | Frase | 172/156 |
| 4,834,189 | 5/1989 | Peterson et al. | 172/158 X |
| 5,361,848 | 11/1994 | Fleischer et al. | 172/140 |
| 5,544,709 | 8/1996 | Lowe et al. | 172/661 |

*Primary Examiner*—Terry Lee Melius
*Assistant Examiner*—Victor Batson

[57] ABSTRACT

A multiple rig row crop cultivator with first and second concave disks supported for operation at two different depths from adjacent rigs to provide two-step sizing of residue. The first disk, located ahead of the second disk, operates at a first depth in the soil to slice out the upper portions of roots and direct plant residue to the row middle. The second disk cuts to a depth approximately twice that of the first disk to further cut out root sections and move the root sections and other plant debris to the opposite row middle. After the disks move stalks and roots to the row middles, sweeps with ridging/bedding wings move the mixture of soil, stalks, and roots to the top of the bed to cover the groove made by the disks and preserve the original plant bed.

21 Claims, 2 Drawing Sheets

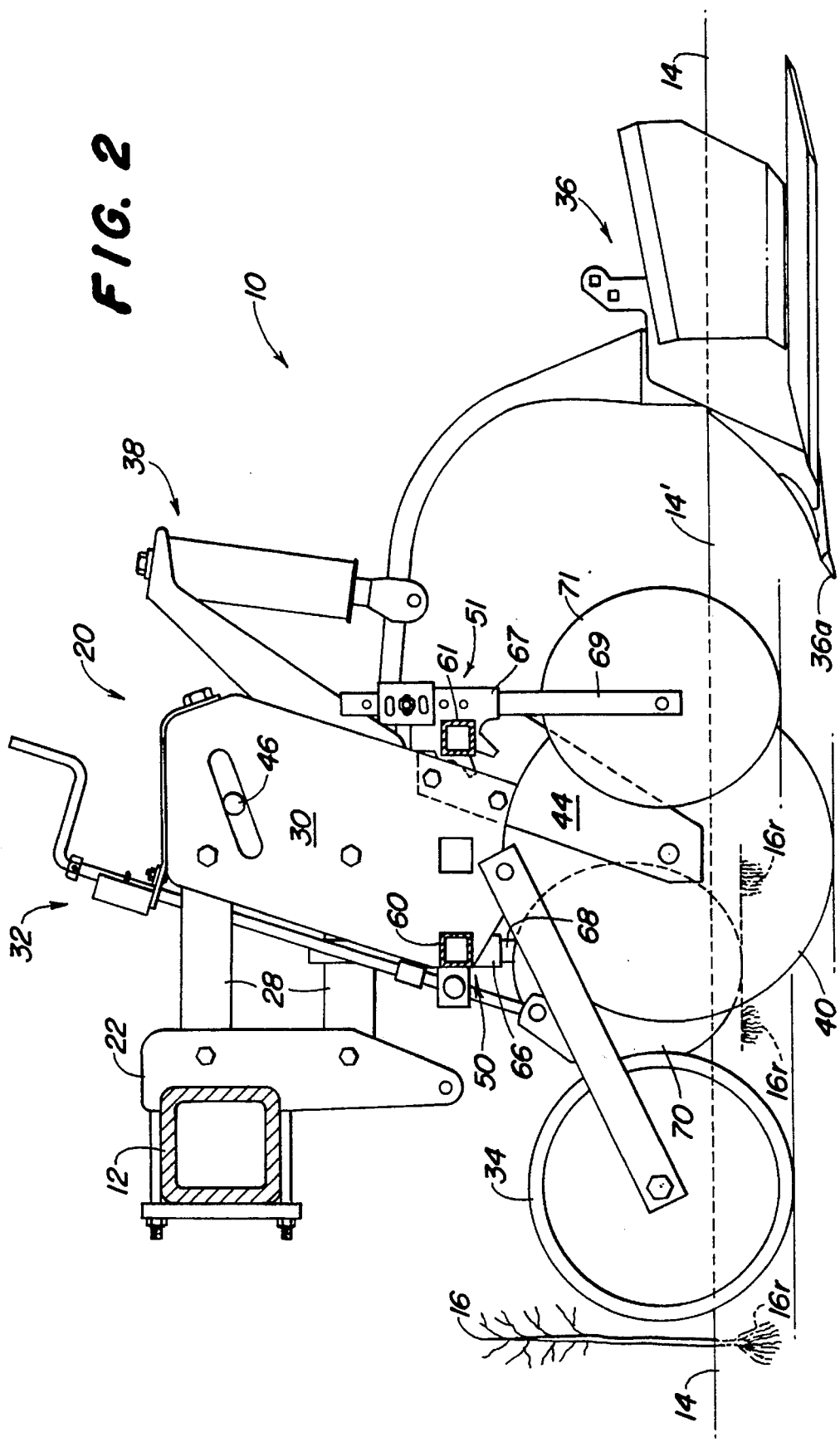

ROW CROP STALK AND ROOT REMOVER

BACKGROUND OF THE INVENTION

1. Field of the Invention

The present invention relates generally to row crop cultivators and, more specifically, to a row crop cultivator for removing plant stalks and roots from a raised plant bed.

2. Related Art

Stalks and roots of plants, such as cotton grown in raised plant beds, often must removed from the beds after the harvest season to prepare the beds for the next planting season. In some applications, farmers desire to retain the plant beds during primary tillage in the fall. Stalk and root removal is particularly important in some cotton producing states where boll weevil eradication programs are in effect. Growers in these states use one of two methods to remove plant residue from beds. Some farmers run sweeps three to four inches deep on top of the cotton row to remove stalks and roots, and a disk follows the sweep to cut up the plant residue. This operation is performed on top of the beds only. A second method involves removal of stalks and roots with a digger wheel arrangement similar to that on a sugar beet harvester. Adjacent opposed wheels pinch and lift the stalk and roots, and then disks follow to cut up the plant residue. Cotton plants have a long tap root that reaches deeply into the ground. Usually the upper portion of the root system is cut out and removed by the tillage operation. Farmers prefer that the removed root portion be cut up into smaller pieces as much as possible. Present methods are not always entirely effective for adequate bed grooming and residue sizing without plant bed deterioration.

BRIEF SUMMARY OF THE INVENTION

It is therefore an object of the present invention to provide an improved row crop cultivator for use in tillage, especially in fields where crops such as cotton are planted in beds. It is a further object to provide such an improved cultivator, for use in plant bed tillage, which preserves the plant bed while adequately removing and sizing root portions and other plant residue. It is still another object to provide such a cultivator with at least two-stage sizing of residue without need for a final disking operation.

It is a further object of the present invention to provide an improved row crop cultivator which sizes residue and removes plant roots from a plant bed more effectively than at least most previously available tillage devices. It is a further object to provide such a cultivator which preserves the plant bed better than most previously available devices.

It is still another object to provide a cultivator for primary tillage in a field with plant beds wherein a pair of concave disks are supported such that stalk and root cutting and removal from the plant beds are substantially enhanced. It is a further object to provide such a cultivator wherein the concave disks comprise barring off disks which are staggered fore-and-aft and operate at different depths in the plant bed to provide sizing of plant residue as well as enhanced root removal from the beds. It is still another object to provide such a cultivator which sweep structure which moves soil and residue back to the center of the plant bed to cover the groove made by the barring off disks.

It is yet another object to provide a cultivator, capable of plant sizing and root removal in plant beds, which retains a good plant bed, wherein sizing and root removal disks are supported from rig frames for balanced side forces.

In accordance with the above objects, a multiple rig row crop cultivator includes first and second concave or barring off disks supported in a unique double offset configuration for operation at two different depths from adjacent rigs to provide two-step sizing of residue and good root removal from the plant bed. The first disk, located ahead of the second disk, operates at a first depth in the soil to cut out plant residue including the upper portion of plant roots. This residue is then moved toward the center of the rig to the row middle. The second disk cuts to a depth approximately twice that of the first disk to move roots to the opposite row middle. After the disks throw stalks and roots to the row middles, centrally mounted sweeps with ridging/bedding wings move the mixture of soil, stalks, and roots from the row middles to the top of the beds to cover the grooves made by the disks. Complete cultivation, good root removal and thorough plant residue sizing are provided while original plant beds are conserved. The pair mountings of front and rear barring off disks from adjacent cultivator rigs is simple and compact in structure and with the central ridging sweep provides balanced side forces and good soil and trash flow for each rig.

These and other objects, features and advantages of the present invention will become apparent to one skilled in the art upon reading the following detailed description in view of the drawings.

BRIEF DESCRIPTION OF THE DRAWINGS

FIG. 2 is an enlarged side view of a portion of the cultivator taken generally along lines 2—2 of FIG. 1.

DETAILED DESCRIPTION OF THE DRAWINGS

Figure 1:
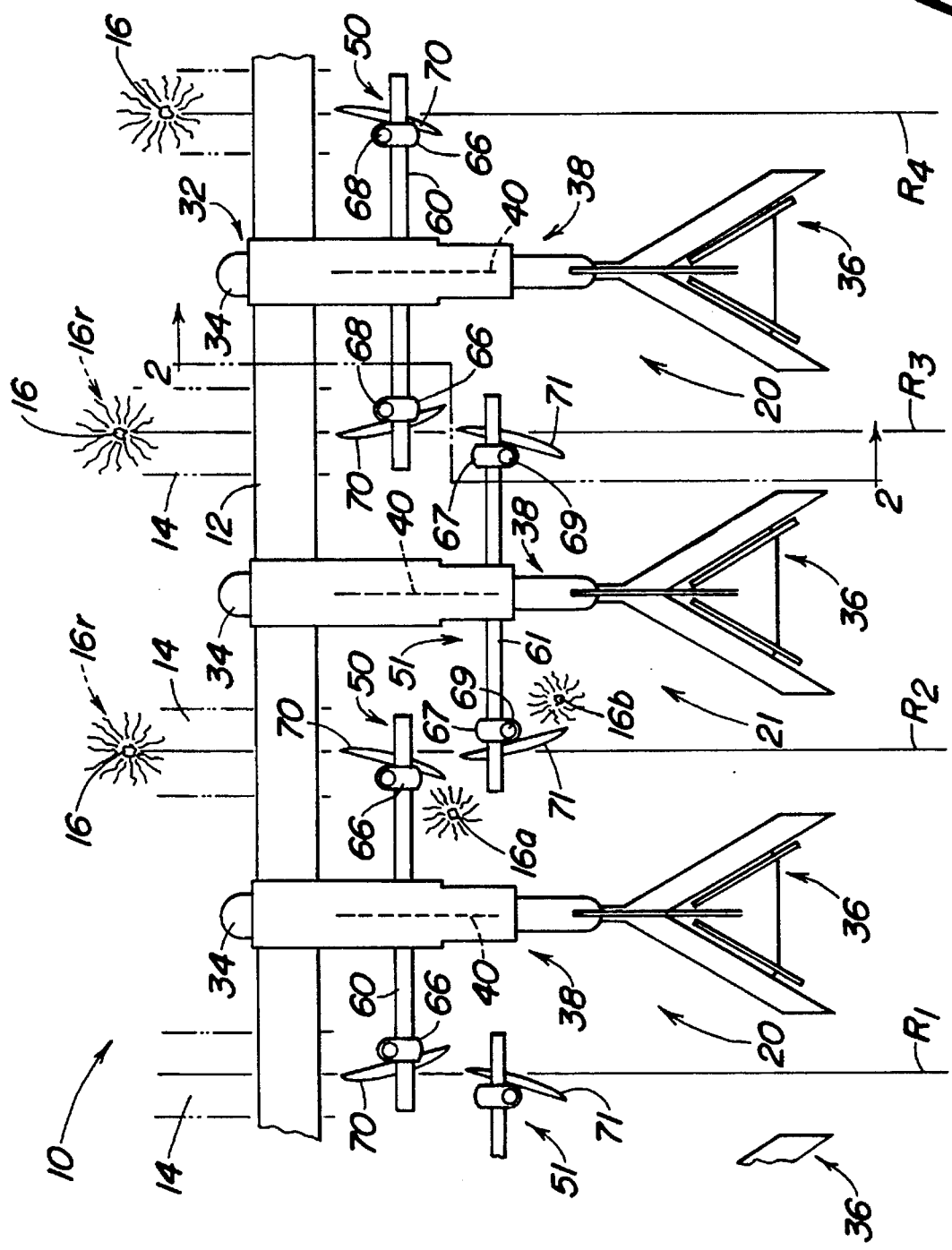
FIG. 1 is a top view of a portion of a row crop cultivator constructed in accordance with the teachings of the present invention.

Referring now to the drawing figures, therein is shown a row crop cultivator 10 having a main transversely extending toolbar or frame 12 supported by conventional tractor hitch structure (not shown) for forward movement over a field with rows of raised plant beds 14 having rows R1–R4 of plant debris 16 such as dry stalks and roots (16r) located below the surface of soil in the beds. A plurality of cultivator rigs 20 and 21 are connected to the frame 12 by brackets 22.

Each of the rigs 20 and 21 includes a parallel bar linkage 28 with forward ends pivotally connected to the bracket 22 and rearward ends connected to rig frame or tool support structure 30. A forwardly extending adjustable depth control assembly 32 with a gage wheel 34 is supported from the structure 30. A trailing and centrally located ridging sweep 36 or similar ridging tool is supported from the aft end of the structure 30 by a trip shank assembly 38. A spring trip shank assembly 38 is shown, but other types of shanks such as rigid shanks could also be used. A rig-mounted coulter 40 is connected to the lower aft portion of the structure 30 by a vertically adjustable standard or support bracket 44. The coulter 40, which typically runs two to four inches deep in the row middle, slices debris and cuts a slit in the soil in line with a leading point 36a of the ridging sweep 36. The ridging sweep 36 operates at a depth approximately equal to but slightly less than the coulter 40 and moves soil and debris (16a) on one side of the slit towards the plant bed on the same side, while soil and debris (16b) on the other side of the slit are moved towards the opposite plant bed. Rig down pressure adjustment is provided by an adjustable spring tensioning device 46 (FIG. 2) located at the upper rear portion of the structure 30. The above-described portions of the rigs 20 and 21 are generally of conventional construction, such as exemplified by the commercially available John Deere 886 Row Crop Cultivator.

The rigs 20 and 21 are generally identical in construction, with the exception of the locations of disk assemblies indicated at 50 and 51 in FIG. 1 and described in detail below. The rigs 20 and 21 are supported from the frame 12 in alternating fashion with the rig coulter 40 and sweep 36 centered between adjacent plant beds 14 and with the ends of the forwardly located disk assemblies 50 extending over adjacent plant beds 14. The ends of the rearwardly located assemblies 51 extend over the plant beds 14 and partially overlap adjacent ends of support assemblies 50.

The disk assemblies 50 and 51 include cross tubes 60 and 61, respectively, of square cross section which are supported in square holes located in the front of the structure 30 and in the support bracket 44, respectively (FIG. 2). The tubes 60 and 61, which preferably have a length about equal to but slightly greater than the distance between adjacent plant rows, extend transversely an equal distance on either side of the rigs 20 and 21, respectively. The tubes 60 and 61 are secured in position in the holes by suitable clamps (not shown).

Disk support brackets 66 and 67 are secured near the ends of the tubes 60 and 61 generally above adjacent plant beds 14. Vertically and angularly adjustable disk shanks 68 and 69 are supported by the brackets 66 and 67. Preferably the shank adjustment is of the type shown and described in commonly assigned U.S. Pat. No. 4,738,316. Concave disks such as barring off disks 70 and 71 are supported at the lower ends of the shanks 68 and 69 for rotation about generally horizontal axes angled at acute angles with respect to the transverse direction so that the disks 70 and 71 are angled from the forward direction to move dirt and debris outwardly from the plant beds 14 toward the row middle and the sweeps 36. As can be best appreciated from FIG. 2, the disks 70 are supported from opposite ends of the tubes 60 on the rig 20, and each disk 70 penetrates the plant beds 14 to a first depth, preferably on the order of two inches (five centimeters) to slice the upper portion of the roots 16r and move the root portions and stalks toward the sweep 36 on the rig 20. The trailing disks 71 are supported from the tubes 61 on the adjacent rig 21 for penetrating the plant beds 14 to a second depth substantially greater than the first depth and preferably on the order of four inches (ten centimeters) for good root removal. The trailing disks 71 move the residue toward the sweep 36 on the rig 21. The ridging sweeps 36 then direct soil and plant residue back towards the adjacent plant beds 14 to preserve the original plant bed location and general plant bed configuration.

The right-hand disk 70 of the pair of disks on one of the tubes 60 is supported for rotation about a horizontal axis which is at an acute angle to the transverse direction. The left-hand disk 70 is supported at an equal but opposite angle to the transverse direction so that the pair of disks 70 are concave towards each other and move soil and debris from adjacent plant beds 14 toward the sweep 36 on the rig 20. The left-hand and right-hand disks 70 operated at equal depths, which, with the equal disk angles, provide balanced forces on the opposite ends of the tube 60. Likewise, the trailing disks 71 on the tube 61 are concave toward each other and are angled from the forward direction in equal but opposite directions to direct material towards the sweep 38 on the rig 21. Equal depth of operation and the equal but opposite working angles of the disks 71 at the end of each tube 61 provide balanced side forces on the rig 21. The rigs 20 and 21 are generally symmetrical about their fore-and-aft centerlines. The disks 70 and 71 are supported from the rigs 20 and 21 such that the disks cut through an area which traverses the plant row centerline (see R1–R4 of FIG. 1) to facilitate root sizing and removal. Preferably, the angle of the disks from the fore-and-aft direction is adjustable using the shank bracket 66 and 67 and is in the range of approximately 0–15 degrees, with an angle of about 10 degrees providing good sizing and material flow characteristics in typical cotton field conditions.

Having described the preferred embodiment, it will become apparent that various modifications can be made without departing from the scope of the invention as defined in the accompanying claims.

We claim:

1. In a row crop cultivator having a frame adapted for forward movement through a field with rows of raised plant beds, the beds including rows of plants having a row centerline, the rows of plants including plant debris such as plant roots located below the surface of soil in the beds and plant stalks, cultivator rig structure for lifting the roots to the surface and cutting the debris, the cultivator structure comprising:

at least first and second cultivator rigs connected to the frame for operating on opposite sides of one of the plant beds;

disk support structure connected to the rigs;

a first barring off disk connected to the disk support structure for entering said one of the plant beds from one side of the bed and engaging the plant debris in the bed a preselected distance below the surface; and a second barring off disk connected to the disk support structure for entering said one of the plant beds from a side of the bed opposite said one side, the second disk located rearwardly of the first disk and engaging the roots a second distance below the surface, the second distance being substantially greater than the first distance and wherein the first disk cuts across the row centerline in a first transverse direction and the second disk cuts across the row centerline in an opposite transverse direction so that the barring off disks size and lift the plant roots.

2. The invention as set forth in claim 1 wherein the disk support structure comprises a first support connected to the first disk and a second support connected to the second disk, the supports extending transversely towards a plant row from the first and second rigs, respectively, and wherein the barring off disks enter the soil on opposite sides of the row of plants.

3. The invention as set forth in claim 1 wherein the preselected distance is approximately two inches (five centimeters) and the second distance is approximately four inches (ten centimeters).

4. The invention as set forth in claim 2 further comprising ridging sweep structure supported outwardly and rearwardly of the first and second barring off disks for covering the area of the plant bed wherein the disks entered the soil to thereby preserve the original plant bed location.

5. The invention as set forth in claim 1 wherein the first disk includes an aft extremity, and the second disk includes a forwardmost extremity lying rearwardly adjacent the aft extremity of the first disk.

6. The invention as set forth in claim 5 wherein the first disk is angled to move debris a outwardly in a first direction transverse to the forward direction, and the second disk is angled to move debris in an outward direction opposite the first direction.

7. The invention as set forth in claim 6 wherein the second disk is angled to move the plant debris toward said one side of the bed.

8. The invention as set forth in claim 2 including a pair of leading barring off disks connected to opposite ends of the first support for operating in a pair of adjacent plant beds, and a pair of trailing barring off disks connected to the opposite ends of the second support for operating in another pair of adjacent plant beds.

9. The invention as set forth in claim 8 wherein the first and second supports include transversely extending beams connected to the respective first and second rigs, the second beam offset rearwardly from the first beam.

10. The invention as set forth in claim 9 further including first and second upright standards connecting the respective first and second disks to the first and second beams, wherein the first standard is offset forwardly from the first beam and the second standard is offset rearwardly from the second beam.

11. The invention as set forth in claim 10 wherein the first disk is angled outwardly to cut across the row centerline in a first direction, and the second disk is angled to cut across the row centerline in a direction opposite that of the first disk.

12. The invention as set forth in claim 11 further comprising ridging sweep structure supported outwardly and rearwardly of the barring off disks for covering the area of the plant bed where the disks cut across the row centerline to thereby preserve the original plant bed location.

13. In a row crop cultivator having a frame adapted for forward movement through a field with rows of raised plant beds, the beds including rows of plants having a row centerline, the rows of plants including plant debris such as roots located below the surface of soil in the beds and plant stalks, cultivator rig structure for lifting the roots to the surface and cutting the debris, the cultivator structure comprising:
- a plurality of cultivator rigs connected to the frame for operating on opposite sides of adjacent rows of the plant beds;
- disk support structure connected to the rigs;
- a plurality of leading concave disks connected to the disk support structure for engaging the plant debris a first distance below the surface in at least first, second and third adjacent beds;
- a plurality of trailing concave disks connected to the disk support structure, each of the second disks located rearwardly of a one of the first disks for engaging the roots a second distance below the surface, the second distance being substantially greater than the first distance, the adjacent first and second disks defining a fore-and-aft spaced disk pair cutting the debris and lifting the roots in one of the adjacent beds, wherein the disk pair cuts through an area which traverses the row centerline, the first disk cutting through the centerline in a first direction and the second disk cutting through the centerline in a second direction opposite the first direction; and
- sweep structure supported from the rigs between the rows for forming ridges over the beds after the first and second disks cut and lift debris from the rows.

14. The invention as set forth in claim 13 wherein one of the rigs supports a cross tube with opposite connecting portions located adjacent the first and second adjacent rows, and wherein the connecting portions support a pair of the second disks in the first and second rows, and wherein the sweep structure includes a ridging sweep supported from one of the said rigs between the pair of second disks to thereby provide a generally balanced side force on said one of the rigs.

15. The invention as set forth in claim 14 wherein a second rig located adjacent one of the said rigs includes a second cross tube with opposite ends, the opposite ends supporting a pair of the first disks in the second and third rows.

16. The invention as set forth in claim 15 wherein the second rig includes a sweep support, and a ridging sweep connected to the sweep support between the second and third rows.

17. The invention as set forth in claim 15 wherein the first disk is supported in the second row and is angled a first direction outwardly from the row, and wherein the second disk in the second row is angled outwardly in a direction opposite the first direction.

18. The invention as set forth in claim 15 wherein the pairs of disks supported from each of the cross tubes are angled in equal and opposite directions to minimize side forces on the rigs.

19. A cultivator having a plurality of rigs supported from a frame and adapted for forward movement over a field of crops planted in parallel rows to size roots of the crops and move plant debris from the row area, the cultivator including:
- a first disk supported from a cultivator rig for operation at a first preselected depth in a given plant row, the first disk operating at a first preselected depth and cutting plant roots off at the preselected depth, wherein the first disk is angled to cut across the row from a first side of the row to a second side of the row; and
- a second disk supported from a cultivator rig, the second disk operating in the given plant row at a second preselected depth substantially greater than the first preselected depth for cutting the crop roots off below the first preselected depth, wherein the second disk is angled to cut across the row from the second side of the row to the first side of the row, the first and second disks thereby sizing the portion of the plant roots above the second preselected depth.

20. The invention as set forth in claim 19 wherein the first disk is supported from a first rig, and the second disk is supported from a second rig adjacent the first rig.

21. The invention as set forth in claim 20 wherein the first rig supports a pair of the first disks in a pair of adjacent rows, and the second rig supports a pair of the second disks in a second pair of adjacent rows, the first and second pairs of adjacent rows having a common central row with a row centerline, wherein the first disk in the row is supported a substantial distance forwardly of the second disk in the row, and wherein the first and second disks in the row are concave in opposite directions and extend on opposite sides of the row centerline so that they cut across the row centerline.

* * * * *